(No Model.)

A. E. PECK.
FISHING REEL.

No. 533,491.

Patented Feb. 5, 1895.

Witnesses:
Chas. E. Van Doren.
Frederick S. Lyon

Inventor:
Arthur E. Peck.
By Paul J. Hawley
his Attorneys.

UNITED STATES PATENT OFFICE.

ARTHUR E. PECK, OF MINNEAPOLIS, MINNESOTA.

FISHING-REEL.

SPECIFICATION forming part of Letters Patent No. 533,491, dated February 5, 1895.

Application filed October 1, 1894. Serial No. 524,559. (No model.)

*To all whom it may concern:*

Be it known that I, ARTHUR E. PECK, of the city of Minneapolis, county of Hennepin, State of Minnesota, have invented certain new and useful Improvements in Fishing-Reels, of which the following is a specification.

This invention relates to improvements in that class of fishing reels in which a spring is arranged to wind up the line or take in the slack when the device is in use.

The invention consists generally in the combination, in a fishing reel, with a main spring and means for winding the spring, of a freely running reel or winding spool, and a train of gears driven from the main spring, with a centrifugally actuated clutch arranged to automatically connect said train of gears with the reel or winding spool whenever it is desired to wind up the line, and to be disconnected automatically from said winding spool or reel when it is desirable to cease winding up the line, with a brake arranged to engage said train of gears for the purpose of stopping the movement of the centrifugally actuated clutch when it is desired to stop winding up the line, and to thereafter hold the main spring under tension until such time as it is desired again to wind up the line.

The invention further consists in details of construction and in combinations all as hereinafter described and particularly pointed out in the claims.

The invention will be more readily understood by reference to the accompanying drawings, in which—

Figure 1:
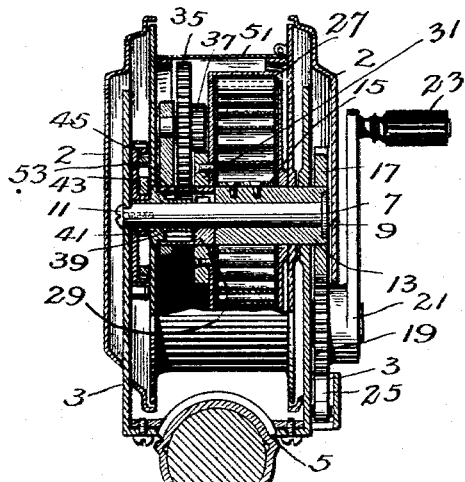
Figure 2:
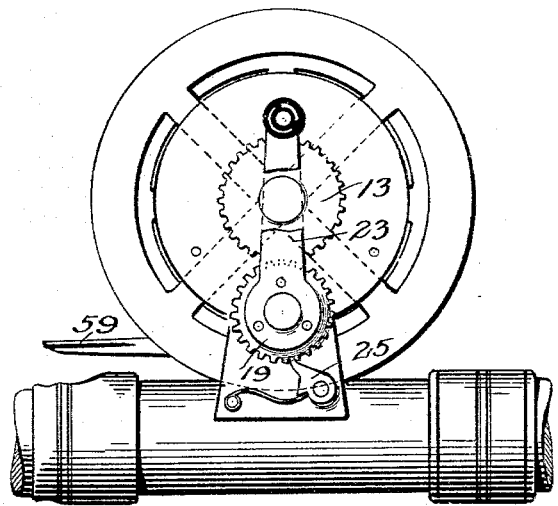
Figure 3:
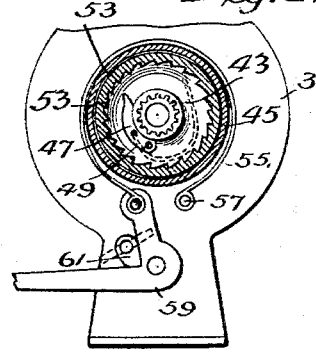
Figure 4:
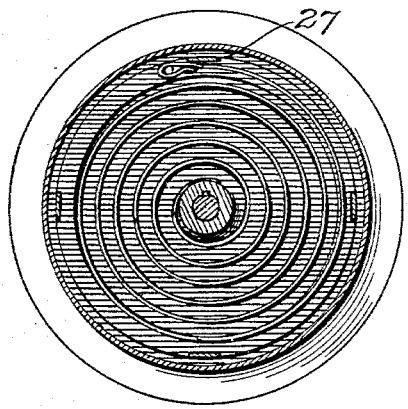
Figure 5:
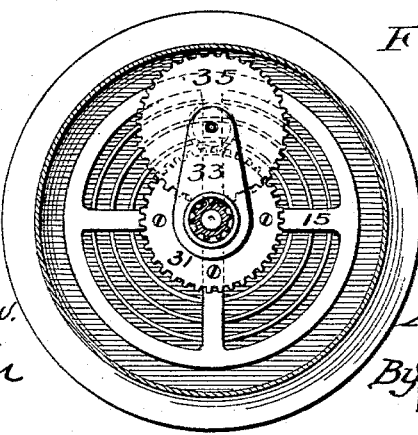

Figure 1 is an end elevation, partly in section, of a reel embodying my invention. Fig. 2 is a side elevation of the same. Fig. 3 is a section through the centrifugally actuated clutch, showing also the friction brake. Fig. 4 is a section through the spring barrel. Fig. 5 is a section showing the arrangement of the train of gears.

In the drawings, 2 represents the side plates forming a part of the frame of the reel. Said plates are connected to the cheek pieces 3 that are secured upon the curved plate 5, adapted to fit upon and be secured to the fishing rod in the usual manner. A stationary stud 7 extends centrally through the reel and is provided with the head 9 upon one end, and its opposite end extends into an opening in one of the cheek pieces 3 in which position it is secured by means of a suitable screw 11 which holds said stud in the stationary position. Arranged upon the stud 7 is a sleeve 13 adapted to rotate thereon and having secured to it the inner end of the mainspring 15. The sleeve 13 projects through the cheek piece 3 upon one side of the reel but not through the side piece 2, and upon the end of said sleeve is arranged the pinion 17, which is engaged by a pinion 19 upon the winding arbor 21, said arbor being provided with an ordinary crank arm and handle 23. A spring pawl 25 is arranged to engage the pinion 19 and prevent any backward movement thereof.

The outer end of the mainspring 15 is secured to the spring barrel 27 in any ordinary manner, and the tension of said spring tends to rotate said barrel upon the sleeve 13 upon which said barrel is mounted. A sleeve 29 is arranged upon the opposite end of the stud 7 and is splined thereto. This sleeve is cored out so as to provide an open center and is also provided with an opening in the wall thereof. One side of the spring barrel preferably projects over the inner end of the sleeve 29, and secured to this side of the barrel is a pinion 31. An arm 33 is mounted upon the sleeve 29 so as to turn freely thereon, and a pinion 35 is mounted upon a stud upon said arm so as to rotate freely. A smaller pinion 37 is connected to the pinion 35, and the pinion 37 engages with and is operated by the pinion 31 upon the spring barrel. The pinion 35 projects through the opening in the side wall of the sleeve 29 and engages a small pinion 39 that is mounted within said sleeve and is arranged to turn freely upon the stud 7. The pinion 39 is formed upon or secured to a sleeve 41, to which is connected a disk 43 having in its outer edge a rib 45 and having secured within this rib a spring dog or pawl 47. The spring 49 connected to said pawl tends to hold it drawn inward toward the center of the disk, but said spring is so light that when the disk 43 is rotated rapidly the pawl is thrown out by centrifugal force toward the circumference of said disk.

Mounted upon the sleeves 13 and 29 so as to rotate freely thereon in either direction, is the line winding spool or reel 51, said spool being free to turn in either direction upon its axis. Secured to one side of said spool within the rim of the disk 43 is the internally toothed ratchet wheel or ring 53. A spring brake 55 is arranged to encircle the rib 45 of the disk 43, one end of said spring being connected to a pin 57 upon the cheek piece 3 and the other end being connected to the short end of a brake lever 59, said brake lever being preferably pivoted to one of said cheek pieces 3. The normal tension of the spring 55 causes it to contract around the rim 45 of the disk 43 and thereby to hold said disk stationary, permitting the spring connected to the dog 47 to draw said dog inward and hold it out of engagement with the ratchet wheel 53. Said brake also prevents the spring barrel from moving by holding the train of gearing between the spring barrel and the disk 43 stationary. By pressing downward upon the end of the lever 59 the short arm of the lever is moved so as to withdraw the spring 55 from engagement with the rim of the disk 43. This immediately releases the said disk and the train of gears, and through said train of gears the disk 43 is rapidly revolved by said main spring. This action causes the dog 47 to be thrown outward by centrifugal force until it engages the ratchet wheel 53. This immediately causes the winding spool or reel to be rotated with said disk and winds up the line as fast as desired.

If it is desired at any time to stop winding the line and to release the reel, the lever 59 is released and the spring brake 55 immediately engages the rim of the disk 43, stopping said disk and holding it in a stationary position. Immediately the dog 47 is drawn inward by its spring 49 so as to disengage the ratchet wheel 53 and thereby said winding spool or reel is disconnected from said winding mechanism.

A turn button 61 may, if preferred, be provided in connection with the lever 59 and by turning this button into engagement with the lever the brake may be disengaged from the disk 43 and held out of engagement as long as desired.

The special advantages of this reel are, that the main spring can be put under tension as often as desired, so that the operation of the reel is not confined to winding so much of the line as can be done by a single operation of the main spring. While the reel is in use and the main spring is in operation winding up the line, the handle can be turned and the main spring continuously placed under tension. A further and most important advantage is that the winding spool or reel is automatically disconnected from the winding mechanism whenever the winding mechanism is stopped by the application of the brake thereto, and said spool or reel is automatically connected to said winding reel or mechanism whenever the winding mechanism is released and permitted to operate by the easing of the brake thereon. This is an important advantage especially for a casting reel, as the fisherman when using the reel can place his thumb or finger upon the brake lever 59 and pressing down thereon release the winding mechanism, which automatically picks up or catches the spool or reel and winds up the line. When this has been wound up to the desired point, relieving the pressure upon the lever 59 stops the winding mechanism by applying the brake thereto and simultaneously the spool or winding reel is automatically disengaged. This permits the fisherman to make a cast with the reel or spool running freely without stopping to disengage the reel from the winding mechanism, and at any time in the progress of winding up the line the winding mechanism can be stopped by releasing the pressure upon the brake lever, and whenever this is done the reel will be automatically disengaged and permitted to run freely in either direction.

Having thus described my invention, I claim as new and desire to secure by Letters Patent—

1. In a fishing reel, the combination of a suitable casing, a shaft mounted therein, a drum upon said shaft, a spring arranged therein, means for winding up said spring a winding spool, a suitable connecting mechanism between said spring and winding spool, and means for automatically throwing said winding spool out of or into engagement with said connecting mechanism, substantially as described.

2. In a fishing reel, the combination of a suitable casing, a shaft mounted therein, a drum upon said shaft, a spring arranged therein, means for winding up said spring a winding spool, a suitable connecting mechanism between said spring and winding spool, means for automatically throwing said winding spool out of or into engagement with said connecting mechanism, and a friction mechanism for arresting the motion of said spool and holding it stationary at any point, substantially as described.

3. In a fishing reel, the combination of a suitable casing, a shaft mounted therein, a drum upon said shaft, a spring arranged therein, having one end secured to said drum and the other to a sleeve upon said shaft, a winding spool, a suitable connecting mechanism between said spool and sleeve, and means for automatically throwing said spool out of or into engagement with said connecting mechanism, substantially as described.

4. In a fishing reel, the combination of a suitable casing, a shaft mounted therein, a drum upon said shaft, a spring arranged therein, means for winding up said spring a winding spool, suitable mechanism connecting said spring and spool, an internally toothed ratchet wheel upon said spool and a pawl carried by said shaft to engage automatically the teeth of said ratchet wheel, substantially as described.

5. In a fishing reel, the combination of a suitable casing, a shaft mounted therein, a drum upon said shaft, a spring arranged therein, a winding spool, a suitable connecting mechanism between said spring and spool, a disk 43 upon said shaft and having the rib 45, an internally toothed ratchet carried by said spool, a spring pawl upon said disk to engage automatically the teeth of said ratchet wheel and a friction mechanism to engage said rib 45, substantially as described.

In testimony whereof I have hereunto set my hand this 10th day of August, A. D. 1894.

ARTHUR E. PECK.

In presence of—
RICHARD PAUL,
FREDERICK S. LYON.